(12) United States Patent  
Assarsson et al.

(10) Patent No.: US 12,154,225 B2  
(45) Date of Patent: Nov. 26, 2024

(54) METHOD OF REAL-TIME GENERATION OF 3D IMAGING

(71) Applicant: Dimension Stream Labs AB, Gothenburg (SE)

(72) Inventors: Ulf Assarsson, Gothenburg (SE); Sverker Rasmuson, Gothenburg (SE); Erik Sintorn, Gothenburg (SE)

(73) Assignee: Dimension Stream Labs AB, Gothenburg (SE)

(*) Notice: Subject to any disclaimer, the term of this patent is extended or adjusted under 35 U.S.C. 154(b) by 0 days.

(21) Appl. No.: 17/766,715

(22) PCT Filed: Oct. 15, 2020

(86) PCT No.: PCT/EP2020/079048  
§ 371 (c)(1),  
(2) Date: Apr. 5, 2022

(87) PCT Pub. No.: WO2021/074298  
PCT Pub. Date: Apr. 22, 2021

(65) Prior Publication Data  
US 2024/0062463 A1    Feb. 22, 2024

(30) Foreign Application Priority Data

Oct. 17, 2019    (EP) .................................. 19203876

(51) Int. Cl.  
*G06T 17/20*    (2006.01)  
*G06T 3/4007*   (2024.01)  
(Continued)

(52) U.S. Cl.  
CPC ............ *G06T 17/20* (2013.01); *G06T 3/4007* (2013.01); *G06T 5/80* (2024.01); *G06T 7/73* (2017.01);  
(Continued)

(58) Field of Classification Search  
None  
See application file for complete search history.

(56) References Cited

U.S. PATENT DOCUMENTS

2002/0126900 A1    9/2002  Kim  
2011/0102553 A1    5/2011  Corcoran et al.

OTHER PUBLICATIONS

International Search Report for International Application No. PCT/EP2020/079048, mailed Nov. 20, 2020, (3 pages).

(Continued)

*Primary Examiner* — Kyle Zhai  
(74) *Attorney, Agent, or Firm* — Kagan Binder, PLLC

(57) ABSTRACT

The present invention relates to a method of real-time generation of a 3D geometry of an object. The method comprises the steps of calibrating at least one RGB camera pair arranged to provide images of the object, receiving input images of the object from the at least on RGB camera pair, and performing a stereo reconstruction in a first hierarchical level using the input images. The stereo reconstruction step further comprises the steps of a) performing a ray marching operation in a first resolution on the input images to determine geometry positions along each view ray of the images; b) applying a uniqueness criterion to the geometry positions; c) determining a normal for each geometry position; d) performing a regularization operation based on the geometry positions and the respective normal, providing updated geometry positions; and e) performing an interpolation operation on the updated geometry positions and respective normal. The method further comprises repeating steps a) and c)-e) in at least one iteration in at least one ascending hierarchical level, wherein the resolution in the ray marching operation is doubled for each iteration, resulting in a geometry buffer for each of the at least one camera pair. The present invention further relates to a 3D image generation device and a system comprising such device.

14 Claims, 8 Drawing Sheets

(51) Int. Cl.
  *G06T 5/80*   (2024.01)
  *G06T 7/73*   (2017.01)
  *G06T 15/06*   (2011.01)
  *H04N 13/15*   (2018.01)
  *H04N 13/239*   (2018.01)
  *H04N 13/246*   (2018.01)
  *H04N 13/271*   (2018.01)

(52) U.S. Cl.
  CPC .............. *G06T 15/06* (2013.01); *H04N 13/15* (2018.05); *H04N 13/239* (2018.05); *H04N 13/246* (2018.05); *H04N 13/271* (2018.05); *G06T 2200/04* (2013.01)

(56) References Cited

OTHER PUBLICATIONS

Zollhöfer et al., "Real-time Non-rigid Reconstruction using an RGB-D Camera," ACM Transactions on Graphics, vol. 33, Isse. 4, pp. 1-12, 2014, (12 pages).

Zollhöfer et al., "State of the Art on 3D Reconstruction with RGB-D Cameras," Computer Graphics Forum, vol. 37, No. 2, pp. 625-652, 2018, (28 pages).

Dou et al., "Fusion4D: Real-time Performance Capture of Challenging Scenes," ACM Transactions on Graphics, vol. 35, Isse. 4, pp. 1-13, 2016, (13 pages).

Newcombe et al., "KinectFusion: Real-Time Dense Surface Mapping and Tracking," Jan. 1, 2011XP055507122, Retrieved from the Internet: URL:https://www.microsoft.com/en-us/research/wp-content/uploads/2016/02/ismar2011.pdf, retrieved on Sep. 14, 2018, (10 pages). (See International Search Report for PCT/EP2020/079048).

Collet et al., "High-quality streamable free-viewpoint video," ACM Transactions on Graphic, vol. 37, No. 4, pp. 69:1-69:13, 2015, (13 pages).

Ondrúška et al., "MobileFusion: Real-time Volumetric Surface Reconstruction and Dense Tracking on Mobile Phones," IEEE Transactions on Visualization and Computer Graphics, vol. 21, No. 11, pp. 1251-1258, 2015 (8 pages).

Liu et al., "High-quality Textured 3D Shape Reconstruction with Cascaded Fully Convolutional Networks", IEEE Transactions on Visualization and Computer Graphics, vol. 14, No. 8, pp. 1-15, 2015, (15 pages).

Heise et al., "Variational PatchMatch MultiView Reconstruction and Refinement," Proceedings of the IEEE International Conference on Computer Vision (ICCV), pp. 882-890, 2015, (9 pages).

Lombardi et al., "Neural vols. 1-15 Learning Dynamic Renderable Volumes from Image," ACM Trans Graph., vol. 38, No. 4, 65:1-65:14, 2019, (14 pages).

| General | | |
|---|---|---|
| Number of cameras | 8 | # |
| Number of camera pairs | 4 | # |
| Camera resolution | 1920x1080 | WxH |
| Stereo reconstruction | | |
| Geometry resolution (Level 0) | 60x35 | WxH |
| Geometry resolution (Level 1) | 120x70 | WxH |
| Geometry resolution (Level 2) | 240x140 | WxH |
| Raymarch length (Level 0) | 5 | cm |
| Raymarch steps (Level 0) | 64 | # |
| Raymarch steps (Level 1) | 16 | # |
| Raymarch steps (Level 2) | 16 | # |
| Match filter size (Level 0) | 6x6 | mm |
| Match filter size (Level 1) | 3x3 | mm |
| Match filter size (Level 2) | 1.5x1.5 | mm |
| Match filter samples | 9 (3x3) | # |
| Align meshes | | |
| Raymarch length | 2 | cm |
| Raymarch steps | 21 | # |
| Iterations | 2 | # |
| Temporal denoising | | |
| Filter width | 5 | # |

*Fig. 8*

METHOD OF REAL-TIME GENERATION OF 3D IMAGING

CROSS-REFERENCE TO RELATED APPLICATIONS

This application claims priority to International Application No. PCT/EP2020/079048, filed Oct. 15, 2020 and titled "METHOD OF REAL-TIME GENERATION OF 3D IMAGING," which in turn claims priority from a European Patent Application having Ser. No. 19/203,876.8, filed Oct. 17, 2019, both of which are incorporated herein by reference in their entireties.

TECHNICAL FIELD

The present disclosure relates to 3D imaging generation, and especially a method for real-time generation of 3D imaging.

BACKGROUND

Free-viewpoint video and performance capture by Collet et al. in "High-quality streamable free-viewpoint video"; ACM Trans. Graph. 34, (July 2015) implement a full end-to-end free-viewpoint video pipeline which achieves high-quality reconstruction for a number of scenes. They combine RGB, active stereo in IR and silhouette information with Poisson Surface Reconstruction to compute high-quality meshes for each frame and track mesh deformations to handle topology changes. Their method requires a high number of cameras and a large studio of specialized equipment. Their method is also computationally expensive; processing one frame on a machine with a dual 12-core processor and an AMD Radeon R9 200 GPU takes them 28.2 minutes.

There are other real-time implementations capable of handling dynamic content satisfactory. A template-based approach achieves high-quality reconstruction of deformable models in real time using a custom-built RGBD camera. While compelling, such method uses only a single view and requires a template first to be acquired for each scene. Such template model is fixed and cannot handle changing scene topologies.

Another strategy is to extend Kinect Fusion, a popular method for scanning static geometry, which fuses depth maps from a single Kinetic sensor at a high frame rate into a volumetric signed distance field. This method handles dynamic scenes by using non-rigid volumetric fusion, where new depth frames are warped to a reference model in a non-rigid manner. This approach does not need an explicit template but still has problems with changing scene topologies, since the method relies on a reference surface model captured at a single point in time.

Fusion4D is a method that combines a volumetric approach with estimation of a non-rigid motion field between frames, as well as using an active stereo approach for acquiring depth information. This approach is state of the art in terms of quality and handles multiple views in real time. It also handles foreground/background segmentation without a green screen. However, it is still computationally expensive and uses dedicated machines with 3.4 GHz Intel Core i7 CPUs and two NVIDIA Titan X GPUs to generate each pair of RGBD stream.

Following and extending this approach, the method of Holoportation creates a room-sized reconstruction that allows for an immersive telepresence system. This system uses a similar approach as Fusion4D but extends it to an interactive system, allowing users to communicate with each other in real-time using AR or VR headsets. Again, this system is computationally expensive, requiring dedicated machines for each depth and color streams.

Further, there exists a vast body of research dedicated to facial reconstruction. One compelling method uses depth cameras for real-time reconstruction, computing a dense correspondence field between the input image and a generic face model. More recent methods use deep-learning-based approaches from single images. Some of these approaches also achieve real-time speeds. All of them, however, require strong priors and explicit or learned models of faces. One method without such priors uses passive stereo and achieve convincing results using an iterative stereo-refinement approach. This method is however far from real time, taking about 20 minutes per frame in its implementation.

Real-time 3D reconstruction has gained momentum since the advent of cheap RGBD cameras such as the Kinect. These devices are often compelling because they can produce depth maps at a high frame rate while being low cost commodity devices. One common approach that these devices use is structured light, where a known pattern is projected onto a scene, and depth values are computed by analyzing how this pattern is deformed when striking surfaces. While giving accurate results, this method cannot be used in a multi-view setup, since the projected patterns interfere across devices. Another common strategy is using time-of-flight based methods for depth estimation. These cameras measure the time-of-flight of an emitted light pulse for each pixel of the camera, which can then be used to infer the depth since the speed of light is known. However, multi-path interference provides inherited problems.

Passive stereo methods use two RGB images to compute depth maps via triangulation. Popular methods that achieve high quality include PatchMatch Stereo, which has also been extended to real-time. One hierarchical stereo matching approach achieves high quality face reconstruction using an iterative refinement scheme. Another approach, using an iterative refinement method implemented using CUDA, achieves real-time performance, albeit with striping artifacts.

While this is a well-studied problem and there exists many compelling approaches, there remains a need for a method that can be used in a simple system and that provides even lower computational complexity than current methods, while retaining an acceptable quality.

SUMMARY

It is an object of the present invention to provide an improved solution that alleviates the mentioned drawbacks with present devices. Furthermore, it is an object to provide a method that can be used for real-time generation of 3D imaging that fast and computational efficient while providing acceptable image quality.

The invention is defined by the appended independent claims, with embodiments being set forth in the appended dependent claims, in the following description and in the drawings.

According to a first aspect of the present invention, a method of real-time generation of a 3D geometry of an object is provided. The method comprises the steps of calibrating at least one RGB camera pair arranged to provide images of the object, receiving at least one pair of input images of the object from the at least on RGB camera pair, and performing a stereo reconstruction using the input images. The stereo reconstruction step further comprises the steps of a) performing a ray marching operation in a first hierarchical level with a first resolution on the at least one pair of input images to determine geometry positions along each view ray of the images, wherein the first resolution is based on a target geometric resolution for a highest hierarchical level; b) applying a uniqueness criterion to the geometry positions and discard geometry positions not fulfilling the uniqueness criterion; c) determining a normal for each geometry position; d) performing a regularization operation based on the geometry positions and the respective normal by intersecting each view ray with planes constructed from neighboring geometry positions and normals, and, providing updated geometry positions as edge-preserving weighted averages of said intersections with respective updated normal; and e) performing an interpolation operation on the updated geometry positions and optionally the respective normal to increase the resolution in each dimension, by first a horizontal interpolation of the geometry positions followed by a vertical interpolation of the geometry positions. The method further comprises repeating steps a) and c)-e) in at least one iteration in at least one ascending hierarchical level of the ray marching operation, wherein the resolution in the ascending hierarchical level of the ray marching operation is increased, for instance doubled, for each iteration, resulting in a geometry buffer for each of the at least one camera pair. The method further comprises, after the final iteration, a step of performing a mesh alignment comprising the steps of f) performing a triangulation of the position buffers and normals into meshes; g) perform a non-rigid alignment to merge the meshes; h) creating a distance map comprising screen-space coordinates of the object silhouette closest to that particular screen-space location for each projected pixel in the mesh; i) rendering, for each mesh of a camera of a camera pair, all other meshes from the camera's view to get a depth map; j) perform, for each position in the mesh of the camera, a screen-space ray marching operation in the normal direction in the depth map, to determine if there are any intersections with another mesh, and if an intersection is determined a vector in direction of the intersection, or average of intersections if there are several, is stored in an output texture; and k) averaging the vectors for each mesh with their neighboring vectors and wherein the averaged vectors are applied to each corresponding position in the mesh.

By providing the above described method, a method of generating a real time 3D imaging of an object is achieved, which can be used in a real time application. The method provides a computational fast and efficient process with kept plausible imaging quality. Further, the method provides that no specific lighting requirements necessary to achieve an acceptable result. Another advantage of the method is that no templates are needed for the creation and recording of the model and rendering of the avatar.

The camera pair comprises two cameras. They are associated to each other as a pair. The cameras in a camera pair may be positioned next to each other, or with a distance to each other. The cameras may be standard RGB webcams, and the setup may be simple without requirements of complicated arrangements of a large number of cameras. In further embodiments of the invention, two, three or four camera pairs used in the method. In a yet further embodiment, between one and eight camera pairs are use.

The uniqueness criterion may for instance be based on energy minimization, expected maximization of similarity, pixel matching, outlier filtering, or the like.

The method may provide a geometry buffer that may generate a view of the scene of the object from a perspective of a virtual camera that a user may control. Following the advantages of the present invention, such control may be performed in real time.

The interpolation operation may use the respective normal of the geometry positions in cases where an interpolated point only has one one valid neighbor. Then the intersection of the view ray with a plane constructed from the neighbor using the normal may be used. If there are two valid neighbors, the new point may be the average of these two points projected on the current view ray.

In one embodiment, the ray marching operation may use the pair of input images from the camera pair, i.e. one image from each camera. Each image may have an image resolution. The exact image resolution may not be important as long as the images has enough image resolution for the geometric resolution that is desired to achieve. If a geometric resolution of M×N is desired at a certain hierarchical level, then M×N pixels in a first of the images are selected, possibly evenly distributed over the image.

For each selected pixel in the first image a corresponding pixel in the other, second, image of the pair of images may be determined. A corresponding pixel may mean that the two pixels picture about the same point for the same object. In the ray marching, a stepwise marching along a ray from the first camera's position in 3D space through the pixel in the first image into the virtual 3D scene. For each step one is at a certain 3D position, p, along the ray. This position p may then be projected on the second image and the pixels from the first and the second images are compared whether the same point that is intended to be 3D reconstructed is pictured. Also pixels around the identified pixels may be used in the comparison. The comparison may result in a score for how good the matching between the two pixels is. Then the marching along the ray may be continued. When the marching along the entire ray is completed, a position p at which the best score may be returned.

In one embodiment, the applying of a uniqueness criterion may comprise that a similar ray marching operation is performed again, but with the first and the second image being switched, such that ray marching is starting from a pixel in the second image and compared to corresponding pixels in the first image. Further, the result from this second operation may be compared to the result of the first ray marching operation whether results for the positions are the same. In one embodiment, the ray marching operation in the uniqueness criterion may be performed based on the pixels that in the first ray marching operation where identified to have a corresponding pixel in the second image.

According to one embodiment, the method may further comprise, prior to the step of performing a stereo reconstruction, a step of creating a visual hull, and wherein the stereo reconstruction may be based on the visual hull. By performing the stereo reconstruction based on a visual hull, the time used for the iterations in the stereo reconstruction may be reduced. The time for an iteration in the stereo reconstruction based on a visual hull may for instance be half the time as without using a visual hull. In an embodiment wherein a visual hull is not used, the step of ray marching in the first iteration may be extended instead.

According to one embodiment, the step of creating a visual hull may comprise a step of determining intersections of silhouette cones from a camera towards the object by rendering every other camera's silhouette cone, using the depth values of these rendered silhouette cones to create a depth map after repeating the step for every camera in the at least one camera pair, wherein the depth map may be used as starting position for the stereo reconstruction.

According to one embodiment, the step of performing an interpolation operation may comprise a step of performing a horizontally aligned interpolation of the positions and normals followed by a vertically aligned interpolation of the positions and normals.

According to one embodiment, the method may further comprise, after the final iteration, a step of performing a mesh alignment comprising the steps of f) performing a triangulation of the position buffers and normals into meshes; g) perform a non-rigid alignment to merge the meshes; h) creating a distance map comprising screen-space coordinates of the object silhouette closest to that particular screen-space location for each projected pixel in the mesh; i) rendering, for each mesh of a camera of a camera pair, all other meshes from the camera's view to get a depth map; j) perform, for each position in the mesh of the camera, a screen-space ray marching operation in the normal direction in the depth map, to determine if there are any intersections with another mesh, and if an intersection is determined a vector in direction of the intersection, or average of intersections if there are several, is stored in an output texture; and k) averaging the vectors for each mesh with their neighboring vectors and wherein the averaged vectors are applied to each corresponding position in the mesh.

According to one embodiment, the length of the vectors stored in the output texture may be weighted with the distance to the closest silhouette point determined from the distance map.

According to one embodiment, the method may further comprise a step of l) updating the normals based on the aligned mesh geometry.

According to one embodiment, the method may further comprise a step of m) repeat steps f)-l) in at least one iteration for all meshes until a desired level of alignment is reached.

When performing either embodiment of mesh alignment, the result may be a mesh that is aligned to other meshes at overlapping locations. By repeating the steps, the level of alignment may be higher for each iteration, and the iterations may be performed until a desired level of alignment is reached.

According to one embodiment, the method may further comprise a step of determining the surface to which positions in the buffer belong when meshes are overlapping comprising rendering a closest front-facing surface and a closest back-facing surface, sorting view-samples according to depth, determining whether a back-facing sample is between two front-facing samples, and if so discard subsequent samples.

According to one embodiment, the method may further comprise a step of n) performing a color blending operation in which colors may be sampled from said one or more camera pair and weighted together.

According to one embodiment, the weighting of the sampled colors may use a linear combination of two weights for each sample.

According to one embodiment, the color C of each color sample may be determined by calculating $$C = \frac{\sum_n \phi \omega_{d,n} c_n + (1-\phi) \omega_{v,n} c_n}{\sum_n \phi \omega_{d,n} + (1-\phi) \omega_{v,n}}$$

wherein $\phi$ is a parameter between 0 and 1, $c_n$ is each color sample, and $\omega_{d,n}$ and $\omega_{v,n}$ are the weights for each sample n, wherein the first weight $\omega_{d,n}$ is sampled directly from the distance map and the second weight $\omega_{v,n}$ is provided by $$\omega_{v,n} = (v_{0,n} - v_{c,n}) \cdot \frac{v_{0,n}}{|v_{0,n}|}$$

wherein $v_{0,n}$ is the view space position of the sample n, and $v_{c,n}$ is the corresponding camera position.

Any of the color blending embodiments above provide a computationally effective way of sampling the colors from the camera pair or pairs to the generated view of the object. In this way, the generation of geometry buffers may be performed efficiency without dealing with colors until when generating the final view.

According to one embodiment, the step of calibrating the at least one camera pair may comprise a step of performing a structure from motion, SfM, process using the object.

According to a second aspect of the present invention, a 3D image generation device is provided, comprising a receiving unit and a processing unit, wherein the device is configured to perform the method according to any of the embodiments above.

According to a third aspect of the present invention, a system for generating a 3D image reconstruction is provided, comprising at least one RGB camera pair and a 3D image generation device according to the embodiment above.

BRIEF DESCRIPTION OF THE DRAWINGS

The invention will in the following be described in more detail with reference to the enclosed drawings, wherein:

FIG. 8 shows a table of parameters used for a method according to an embodiment of the present invention;

DESCRIPTION OF EMBODIMENTS

Figure 1:
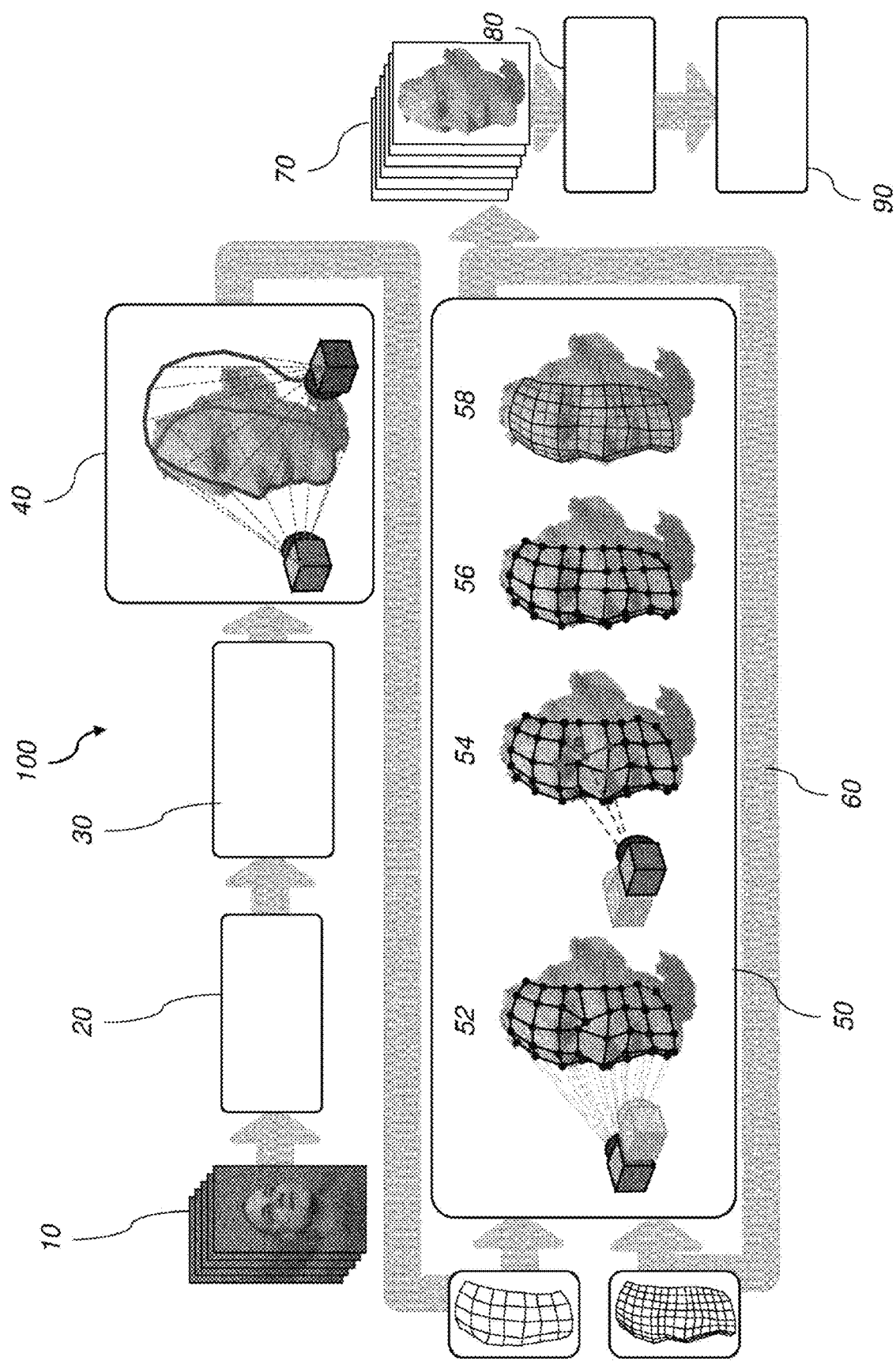
FIG. 1 shows an overview flow chart of a pipeline according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

In the embodiment presented in the following, eight webcams are used that are grouped into stereo pairs and placed in an arc around the model. An advantage with the invention is that relatively simple cameras can be used, such as Logitech C922 webcams. A green screen and two diffuse light sources can be used to help background segmentation and uniform lighting. The cameras are calibrated 20 with a semi-automatic method and corrected for scale. Different methods are available for such calibration.

The cameras are connected to a computer comprising a Central Processing Unit (CPU) and a Graphics Processing Unit (GPU).

The method according to an embodiment of the present invention is illustrated in FIG. 1 as a real-time pipeline consisting of multiple stages that start with image capture and end with a final view rendered from the current position of a user-controlled virtual camera. All major steps of the pipeline are computed on the GPU.

The method starts by a capture 10 of the scene and preprocess 30 the images by undistorting from the camera's distortion parameters, converting to grayscale, and applying background segmentation. A visual hull 40 of the geometry is computed (optional) to constrain the search space for the stereo-matching steps 50.

Figure 3:
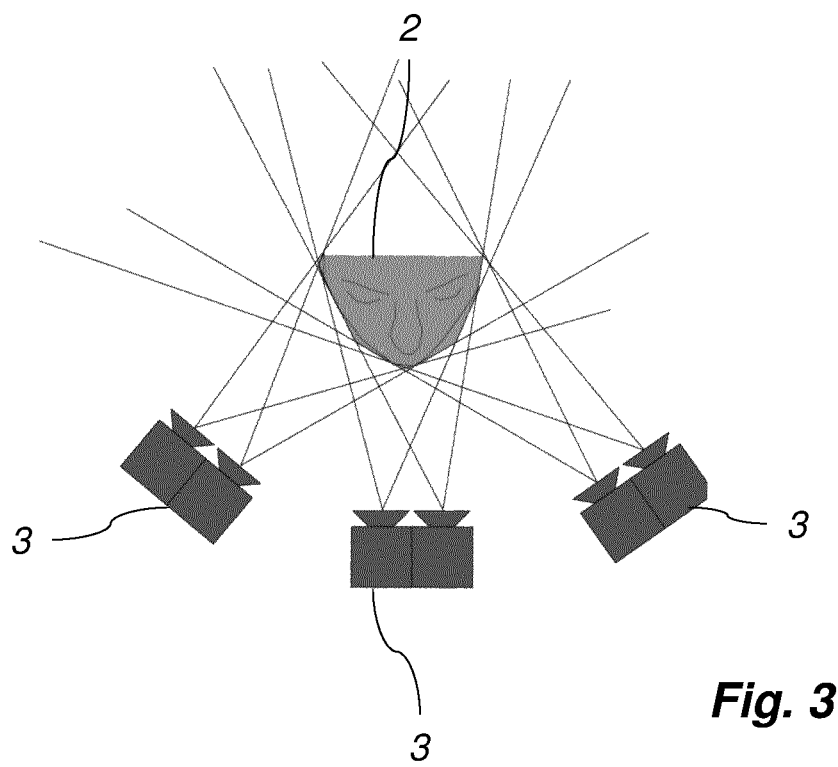
FIG. 3 shows the intersection of the segmented foreground surfaces providing a visual hull that creates a bounding volume for where the geometry resides.

The geometry is computed per camera pair 3 (see FIG. 3), using an optimized view-space stereo-matching method. The method is composed of multiple steps, and is applied hierarchically in a coarse-to-fine measure. Early in the method, geometry normals are estimated, which are used to orient the matching filters, as well as for regularization 56 and interpolation 58. Constraints are applied to discard invalid parts of the geometry.

Position and normal buffers from the stereo reconstruction 50 are used to create one mesh per camera pair. To minimize gaps in the overlap between these meshes, they are processed with a screen-space non-rigid alignment method that deforms the meshes relative to the local quality of the reconstruction using a distance-to-mesh-silhouette weighting. Finally, these meshes are rendered from a current virtual camera position. In this camera's screen-space it is resolved which meshes are visible for each pixel, and a final color using blending can be computed. This blending function uses two weights; one that represents the angle between the virtual camera and the recording cameras, and one that is sampled from a distance-to-mesh-silhouette map computed in screen-space for the virtual camera.

Calibration

In one embodiment, system may be calibrated using a standard structure from motion (SfM) pipeline. A simple pinhole camera model may be used with one coefficient of radial distortion. Before capture, the intended subject can be used as calibration target. This has two advantages; it optimizes the calibration for the specific scene in question, and calibration can be done just before capturing is started. This minimizes the risk of accidentally moving the cameras or otherwise disrupting the scene before recording. To this calibration, an extra step may be added to also compute the scale of the scene, which may simplify the reasoning about its geometrical quantities. This is done by using a small board with two black circles, spaced at a known distance. The black circles are detected in two chosen cameras in image space using OpenCV, and the world space position of each circle is obtained using triangulation with the obtained calibration from the SfM. The computed distance between the circles can then be compared to the known distance to produce a scale factor.

Capturing And Preprocessing

In one embodiment, each video feed from the cameras is streamed in Full HD resolution at 30 Hz to the computer. FFmpeg can be used to capture the video streams directly into the pipeline, or to replay pre-recorded video streams. These FFmpeg instances run on separate CPU threads decoding video in the background. Two different synchronization schemes are used depending on the source. For live video, it is ensured that the incoming streams use small buffers and that the pipeline is emptied as fast as possible (possibly by dropping frames), so that always the latest incoming frames get into our pipeline. For recorded streams, the videos may be synchronized by using the embedded presentation time stamps for each frame. This synchronization will only be approximate, since the cameras does not have a global synchronization mechanism.

The cameras could be configured to have automatic exposure disabled, to ensure comparable colors across cameras, and auto-focus disabled so as not to disrupt the calibration. For simplicity and higher quality, the green screen may be employed to help with background/foreground segmentation. Two diffuse light sources may be used to get reasonably uniform lighting. The person in capture imaging may also use a green shirt to provide a precise segmentation of the neck region.

At the start of each frame, the captured images are immediately uploaded to GPU memory and all subsequent computation is performed on the GPU. This leaves the CPU free to decode the video streams and perform application logic. At the cost of a single frame of latency, the next frame could be uploaded asynchronously while processing the current. The first step in the image preprocessing is undistortion of the captured images from the distortion parameters captured in the calibration step. Next, a standard chroma-key algorithm may be used to get a high-quality segmentation of the object 2. Finally, the images are converted to grayscale and a mipmap hierarchy is computed.

Figure 2:
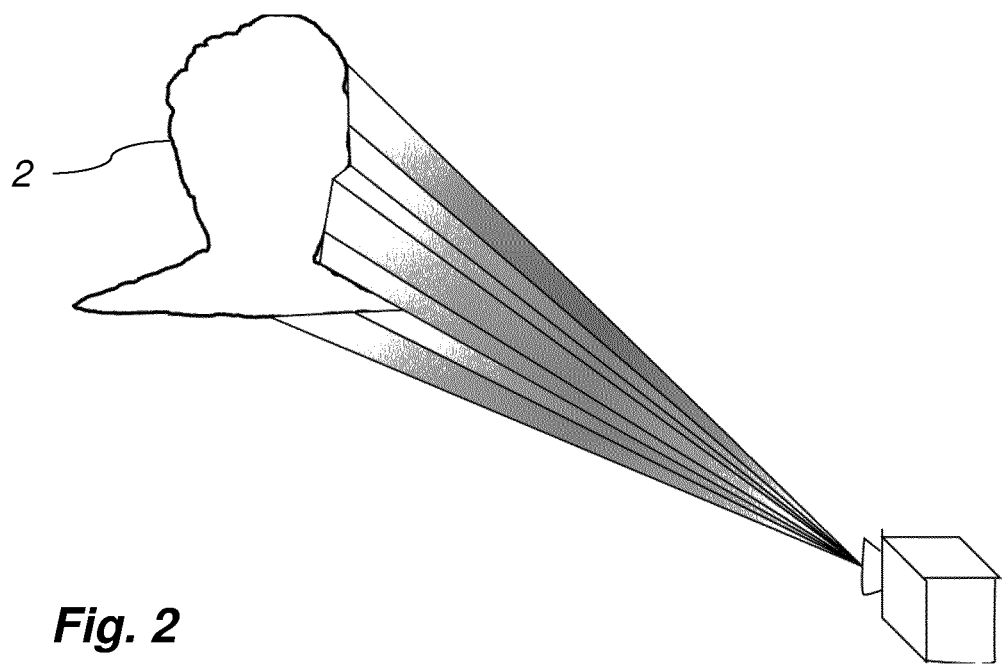
FIG. 2 shows an illustration of a camera's silhouette cone is constructed with tringles that extend from the camera center to the silhouette of the segmented foreground.

The volume of where the potential geometry resides may be significantly restricted by utilizing a foreground segmentation and a wide-angle setup, as illustrated in FIG. 2. For each, camera, a surface is created, which consists of triangles with one vertex in the camera center and two vertices along the silhouette (see FIG. 2). The intersection of these silhouette cones, the shaded area of the object in FIG. 3, creates a boundary for the geometry which is commonly called the visual hull. To compute this intersection efficiently for a specific camera, every other camera's silhouette cone is rendered from it in turn, storing only the depth value. As each of the other cameras is rendered in this manner, the new values are blended into the frame buffer, for each pixel retaining the smallest value (e.g. furthest away from the camera in an OpenGL coordinate system), effectively tightening the boundary around the geometry. This is then repeated for all cameras. This computed depth map can then be used as a starting position for the following stereo reconstruction, which both decreases the number of matches that need to be performed, as well as the risk of outliers in the stereo matching.

Stereo Reconstruction

Figure 4:
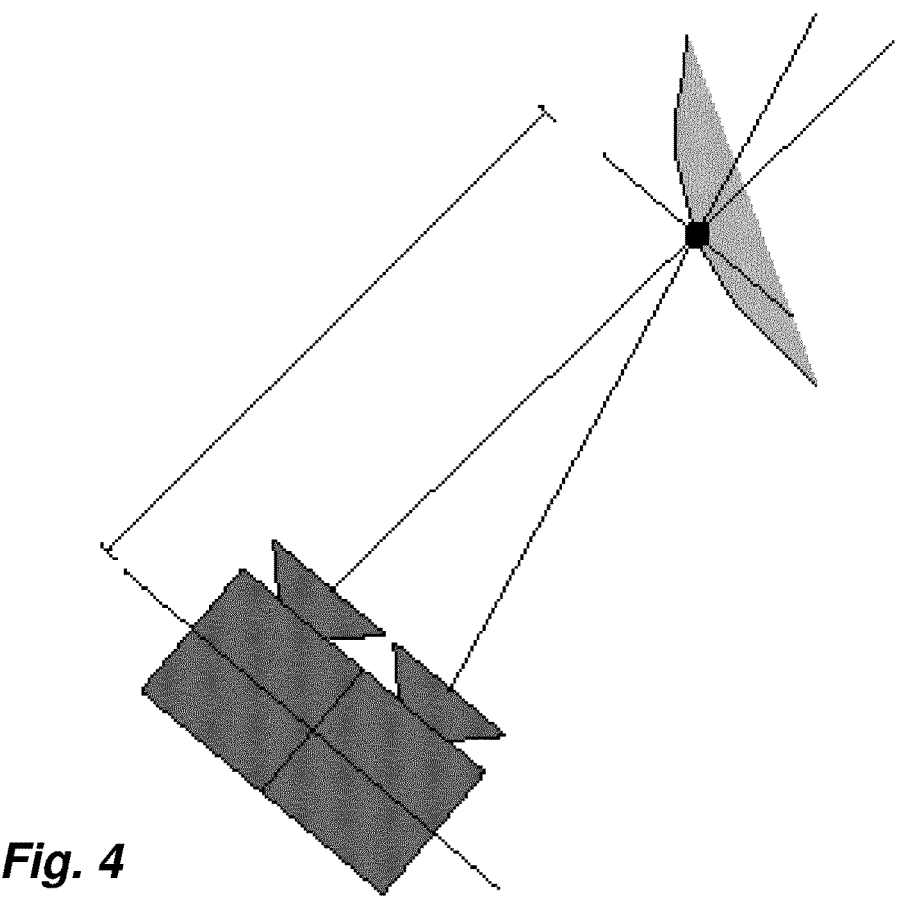
FIG. 4 shows an illustration of reprojected images in a rectified image pair according to prior known methods.
Figure 5:
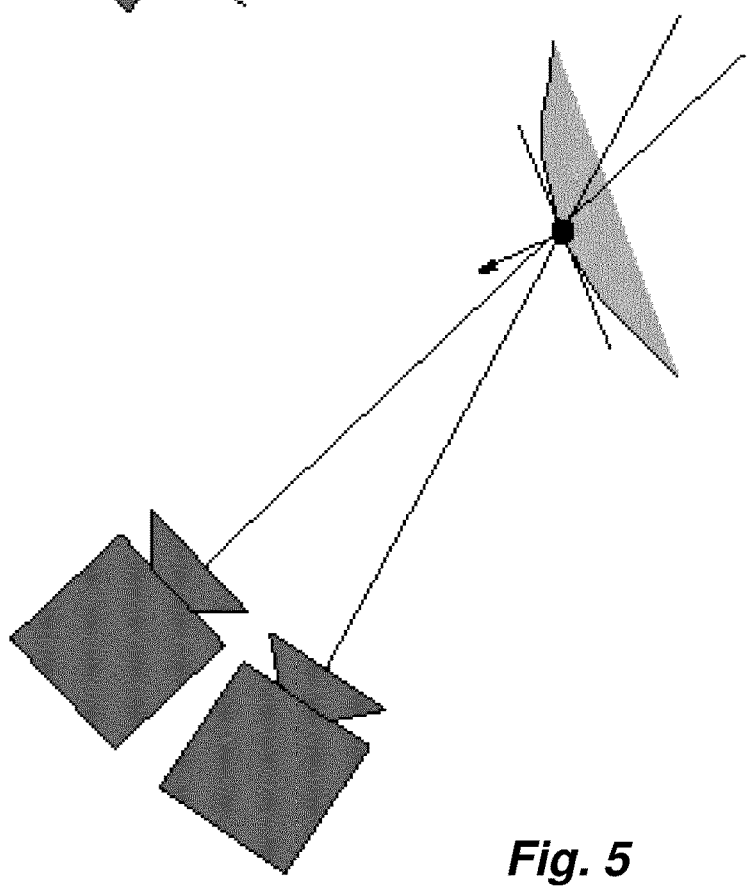
FIG. 5 shows an illustration of a rectification using surface-oriented matching windows according prior known methods.

The conventional method of doing local stereo matching is to use epipolar geometry and compute the matching over an N×N pixel window in a rectified image pair, i.e. two images where the image planes are parallel. This is done both as a simplification to the matching problem and as an optimization, since a view ray from the first image projects to a horizontal line in the second image. This greatly increases performance in CPU implementations since it leads to a much more cache-friendly data-access pattern. However, there are two major drawbacks with using image rectification; the first is the inevitable distortion of the rectified image under reprojection, the other is the implicit use of fronto-parallel matching windows (see FIGS. 4 and 5). Popular techniques such as PatchMatch Stereo have shown that there can be significant quality gains from using oriented matching windows. In the present invention, normals are estimated that can be used to orient matching windows, as well as for geometry-aware interpolation and smoothing (see further below), and rectification can thereby be excluded completely. This does not affect performance significantly in our GPU centric implementation, since GPUs rely much more on latency hiding than caches and since the GPU's texture cache is optimized for spatial locality.

In an embodiment of the present invention, for each camera pair, a hierarchical local stereo-matching method is used. However, to be able to easily estimate and utilize normal information, stereo matching is done by raymarching view rays from one camera in each pair and storing the results as view-space geometry buffers. The matching is divided both into multiple steps and in a hierarchical fashion, where the resolution is doubled in each dimension for each level of the hierarchy (see FIG. 1). This resolution is a target geometric resolution, which is equal to the resolution for the highest level in the hierarchy. Below, it is started by describing each step for the first hierarchical level, followed by a description of how higher hierarchical levels are handled.

Raymarching

In the first ray-marching step, a resolution N times lower than the defined geometric resolution is started with. I.e., a view ray is followed for each $2^N$th vertical and $2^N$th horizontal pixel for one of the cameras in each pair. Marching is performed along the ray for a fixed length starting from the conservative estimate of the geometry constructed as described above. For each step along the ray, a rectangular filter is constructed in world space and projected on both cameras. Colors are sampled with mipmapping in the corresponding color textures, and the distance between both patches is computed using a mean-subtracted Sum of Absolute Difference (SAD) cost function, where the distance $D_{SAD}$ is computed as $$D_{SAD} = \frac{1}{n}\sum_{i=0}^{n} |(p_i - \mu_p) - (q_i - \mu_q)|$$

where n is the number of samples, p is each sample from the first image with corresponding mean value $\mu_p$, and q is each sample from the second image with corresponding mean value $\mu_q$. This cost function is chosen since it is robust to local lighting conditions while still being cheap to compute, since an approximate mean value can be sampled by using tile mipmap hierarchy. The position with the best score along the ray is written to the position buffer.

Uniqueness

In the marching step, no threshold is used on the matching score and the best matching point along the ray is taken. This gives rise to invalid geometry in areas where only one of the cameras has visibility. In the second step, this problem is addressed by identifying these problematic areas by projecting the obtained position buffer from the first camera onto the second camera and then do stereo matching along the second camera's view rays for the projected points. If the best match along this ray does not closely match the best match from the first camera, the point is discarded.

Normals

Up until this step (for the first hierarchical level), no normal information for the geometry has been used, and the filters used have been oriented with the z-plane of its corresponding camera. Now that a first initial guess of the geometry is obtained, the normals can be estimated. This may be done using a simple average of computed normals using the cross product of neighbors of each position in the buffer.

Regularization

Figure 6:
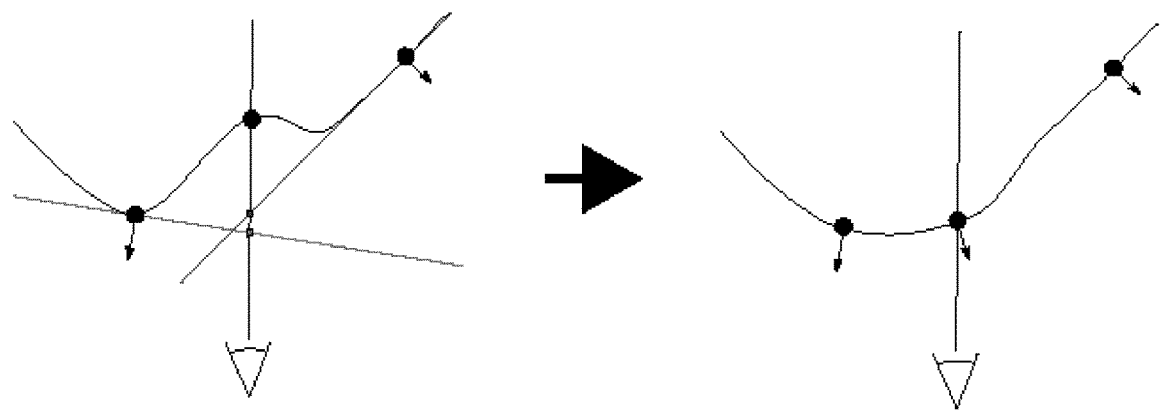
FIG. 6 shows a step of regularization according to an embodiment of the present invention, looking at the intersection of the current view-ray with planes constructed from neighboring positions and normals, used for computation of a regularized position as an edge-preserving weighting of the ray/plane intersections.

The raw stereo matching is noisy, and one may want to enforce that a continuous surface is reconstructed. This can be done in a regularization step, where the current view ray is intersected with planes constructed from each of the neighboring points and normals, see FIG. 6. An edge-preserving weighted average of these intersections is computed as a new position along the ray. With $t_n$ being the parameter along the ray corresponding to an intersection between the current view-ray $r_v$ and a plane constructed with a neighboring point $P_n$ and corresponding normal N it provides $$t_n = \frac{-(P_n \cdot N)}{r_v \cdot N}$$

for each neighbor n. A weight $w_n$ can be computed which is the inverse absolute distance between this point along the ray and the corresponding point along the ray for the current point $P_0$ as $$w_n = \frac{1}{|t_n - |P_0||}$$

The new point P along the ray can then be computed as $$P = \frac{P_0}{|P_0|} \frac{\sum_n w_n t_n}{\sum_n w_n}$$

for all neighboring positions.

In this step basic hole-filling may also be done if a point has many valid neighbors, and pruning, if a point has very few valid neighbors. After this step, the normals are recomputed in the same manner as discussed above.

Interpolation

The last step of the stereo reconstruction method is to interpolate positions and normals for the next level in the hierarchy. This is done in a separable method, first horizontally and then vertically in the view-aligned geometry buffers. If there are two valid neighbors, the new point is the average of these two points projected on the current view ray. If there is only one valid neighbor, the intersection of the view ray with a plane constructed from the neighbor may be used, similarly as discussed above.

Higher Levels of the Hierarchy

The next levels of the hierarchy are executed in the same manner, doubling the resolution (see above) for each iteration until the highest hierarchical level has finished. A few differences from the first hierarchical level should however be noted. There are now estimated normals in each step, and the filters used for stereo matching are thus oriented in the corresponding direction. There is no longer a fixed raymarch length for the raymarching, but the range is instead computed before starting stereo matching for the current hierarchical level. The range is computed as double the maximum distance from the current position to the intersection of the current view-ray with planes constructed by all neighboring positions and their corresponding normals. This gives us a rough estimate of the curvature of the local geometry and adapts the search range accordingly. Finally, since the uniqueness step is very costly, equally expensive as the actual marching step, it may only be performed in the first hierarchical level. This should, however, not lead to invalid points being introduced again, since these will not be rematched further up the hierarchy.

Temporal Denoising

Immediately following the stereo reconstruction, one may employ a simple averaging scheme to suppress noise in the computed geometry buffers. The pipeline is delayed with N frames, and then creates an average filter over the view space positions with N frames forward in time and N frames backwards in time, centered around the current frame. Averaging in the case of the current frame's positions being invalid may also be done. This has a hole filling effect that mitigates flickering triangles along silhouettes. After this step, the normals may be recomputed to match the new geometry.

Mesh Alignment

For each camera pair, there is now view-space geometry buffers. In offline algorithms, these buffers would now be merged in a global surface reconstruction step using e.g. Poisson Surface Reconstruction, along with further refinement steps. For performance reasons, in this embodiment of the present invention a simpler approach is used. Each set of position buffers and normals are triangulated into meshes using a simple grid-based algorithm. Since these meshes are computed independently for each camera pair, they will not have perfect overlap, and small gaps can be seen when the meshes are overlaid on top of each other. To remedy this, a non-rigid alignment algorithm is used that merges the meshes together in the overlapping parts.

The quality of the meshes will reflect the quality of the stereo reconstruction and is thus dependent on well textured areas that are visible in both cameras. The quality will generally be worst at silhouettes, where the geometry has a high angle towards the camera and the visibility for the whole projected matching filter is not guaranteed for both cameras. Following this argument, the heuristic that is used is that the quality of the mesh is lower closer to the silhouette of each mesh, and those areas may be aligned to an overlapping mesh whose local area is further away from its corresponding silhouette.

Consequently, there may be a need to determine how close it is to the silhouette for each point in the mesh. Optimally, one would like to compute the actual geodesic distance along the mesh, but for performance reasons one may instead compute the distance in pixels for the projected mesh. This computation is done in screen space with a GPU version of the flood-fill algorithm, called jump flooding.

First, computing the location of all silhouette points in a single pass is done by looking at the validity of neighboring pixels for each pixel. The pixel locations of these silhouettes are then propagated to every other pixel in the projected mesh and stored in a distance map. If a propagated silhouette location is closer to the current pixel than what was previously written in the distance map, or if it did not have any previous value, it is updated with this new location. When finished, the distance map contains the screen-space coordinates of the silhouette closest to that particular screen-space location, for each projected pixel in the mesh.

The mesh-alignment algorithm uses an iterative approach, where each mesh is considered in relation to the other meshes one by one. For each camera for which a mesh has been generated (i.e. one per each pair of cameras), all other meshes are rendered from its view to get depth maps, and a distance to silhouette map is computed for it. For each position in the current mesh, a screen-space raymarching is then done in the normal direction in these depth maps, to see if there is an intersection with any of the other meshes. If there is, a vector in the direction of that intersection is stored (or average of intersections if there are several) in an output texture. The length of this vector is weighted with the distance to the closest silhouette as read from the corresponding distance map. These movement vectors for each mesh vertex are averaged with their neighbors in a following pass and are then applied to each corresponding position. The final result is a mesh that is aligned to the other meshes at overlapping locations. The vertex normals are then updated to correspond to this new aligned geometry. This whole process is then repeated for each mesh and can also be executed iteratively for all meshes until the desired level of alignment is achieved.

Final View Generation

The purpose of the pipeline according to the described embodiments is to generate a view of the scene from the perspective of a virtual camera controlled by the user. A final step may thus be to compute this view using a reconstructed geometry, the set of aligned meshes, and the captured camera images. The meshes are rendered to the current virtual camera position into separate geometry buffers. To weight the colors together, a distance-to-silhouette map is computed for each rendered mesh with the same method as described above.

Mesh Visibility

Since the meshes are overlapping, there is a need to decide which positions that belong to the same surface if there are fragments from more than one mesh rendered to a pixel. These fragments could belong to samples of the same surface, but could also belong to other surfaces now occluded by this front-most surface. In the geometry buffers for each mesh, the closest front-facing surface is rendered but also the closest back-facing surface. If view-samples are sorted according to depth, it can be found if any such back-facing samples are in between two front-facing ones. In that case it may be known that the subsequent samples surely belong to another part of the geometry and can be discarded. Also, a simple threshold may be employed to discern between surfaces to help with situations where imperfect geometry prevents using this scheme. If the distance between two front-facing surfaces is greater than this threshold, they are considered different surfaces and only the closest is kept.

Color Blending

The fragments that have been deemed visible from the current view can now be projected on to its two corresponding camera images, where the final colors are sampled.

These colors, sampled from one or many camera pairs, are weighted together using a linear combination of two weights $\omega_{d,n}$ and $\omega_{v,n}$ for each sample n. The first weight $\omega_{d,n}$ is sampled directly from the previously computed distance map and ensures that smoothly varying colors on the overlapping edges between meshes are achieved. The second weight $\omega_{v,n}$ captures view dependence and is computed as $$\omega_{v,n} = (v_{0,n} - v_{c,n}) \cdot \frac{v_{0,n}}{|v_{0,n}|}$$

where $v_{0,n}$ is the view space position of the fragment n, and $v_{c,n}$ is its corresponding recording camera position. Using these weights for each color sample the final color C can be computed as $$C = \frac{\sum_n \phi \omega_{d,n} c_n + (1-\phi) \omega_{v,n} c_n}{\sum_n \phi \omega_{d,n} + (1-\phi) \omega_{v,n}}$$

where $\phi$ is a parameter between 0 and 1 and $c_n$ is each color sample.

Figure 7:
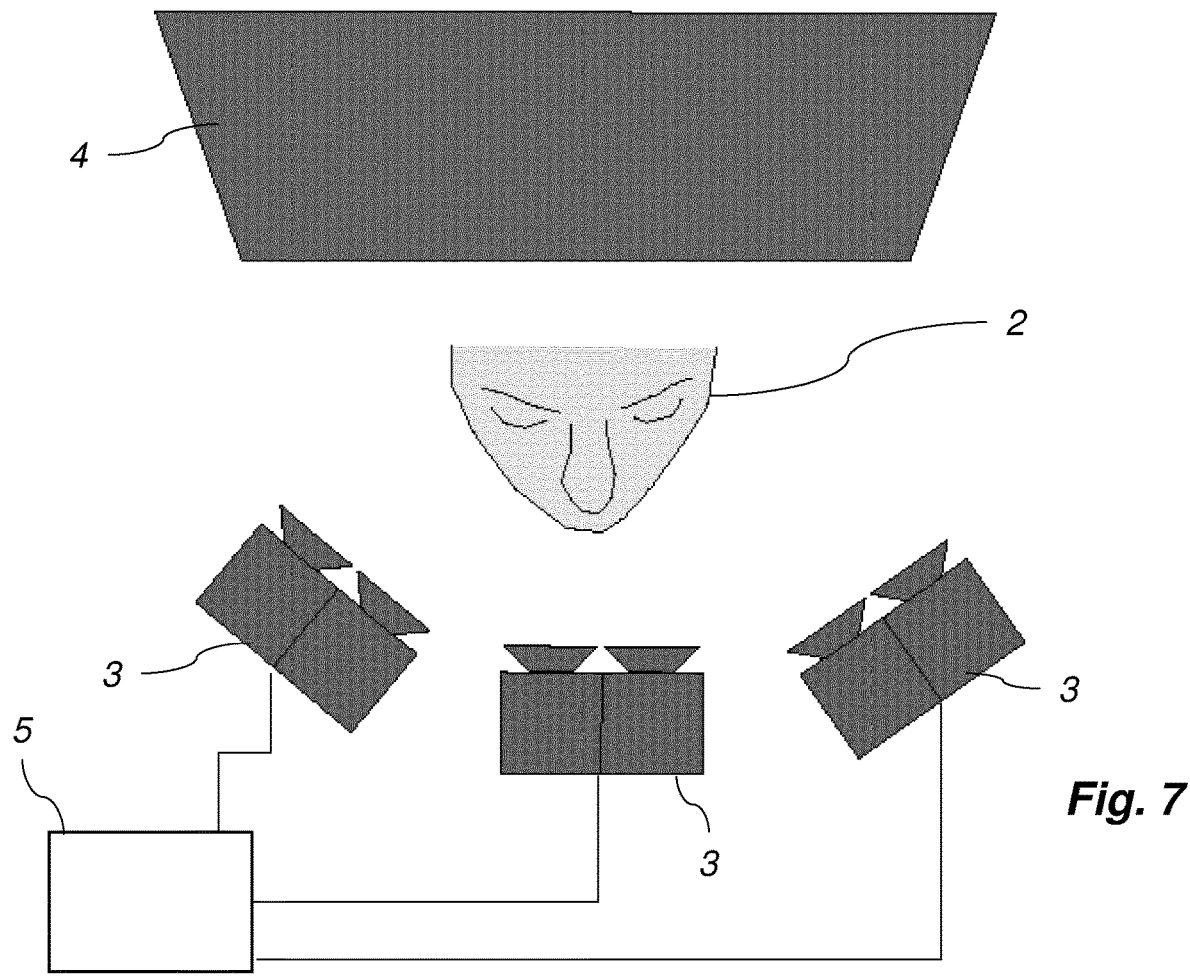
FIG. 7 shows an exemplary camera pair setup according to an embodiment of the present invention.

FIG. 7 illustrates a system according to an embodiment of the present invention. A 3D image generation device 5 is connected to RGB camera pairs 3 directed towards the object 2. In the illustrated embodiment, a green screen 4 is used behind the object 2 to facilitate the image processing. The 3D image generation device 5 comprises a receiving unit for receiving the image input from the cameras, and a processing unit configured to perform a method according to the embodiments described above.

In an exemplary embodiment, the method may be performed with the parameters as seen in FIG. 8. The performance of further embodiments is shown in FIGS. 9a-d.

Figure 9A:
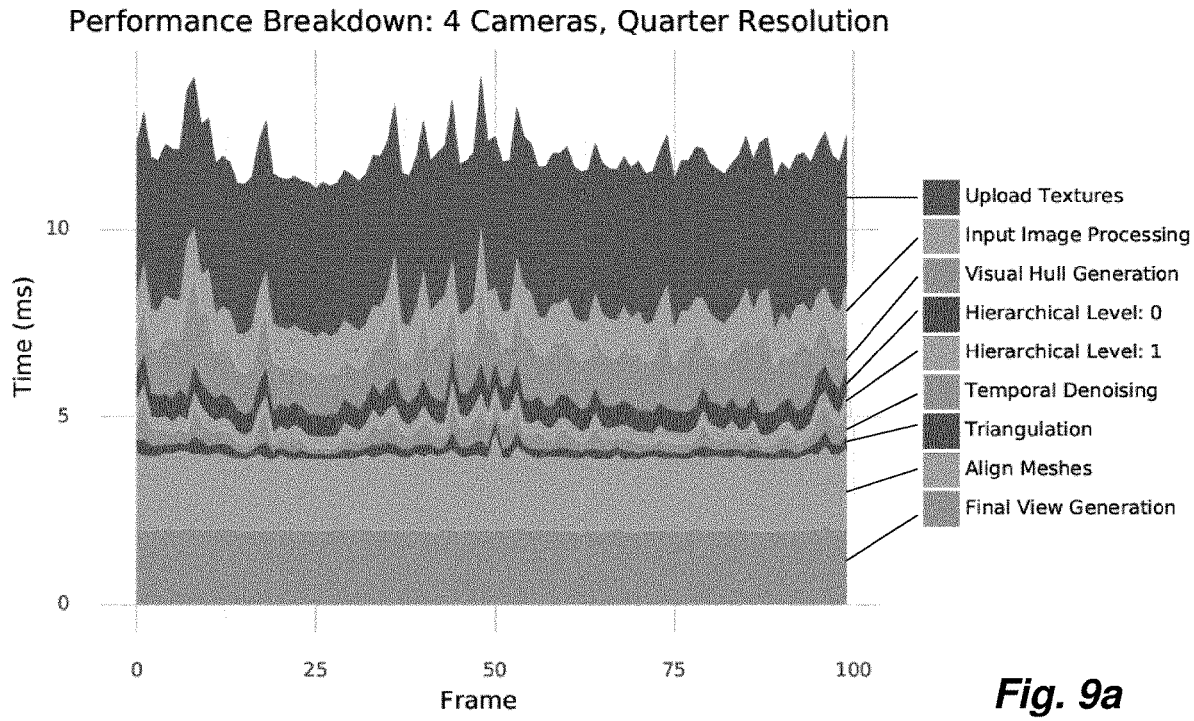
FIGS. 9a-d show performance illustrations of methods according to embodiments of the present invention.
Figure 9B:
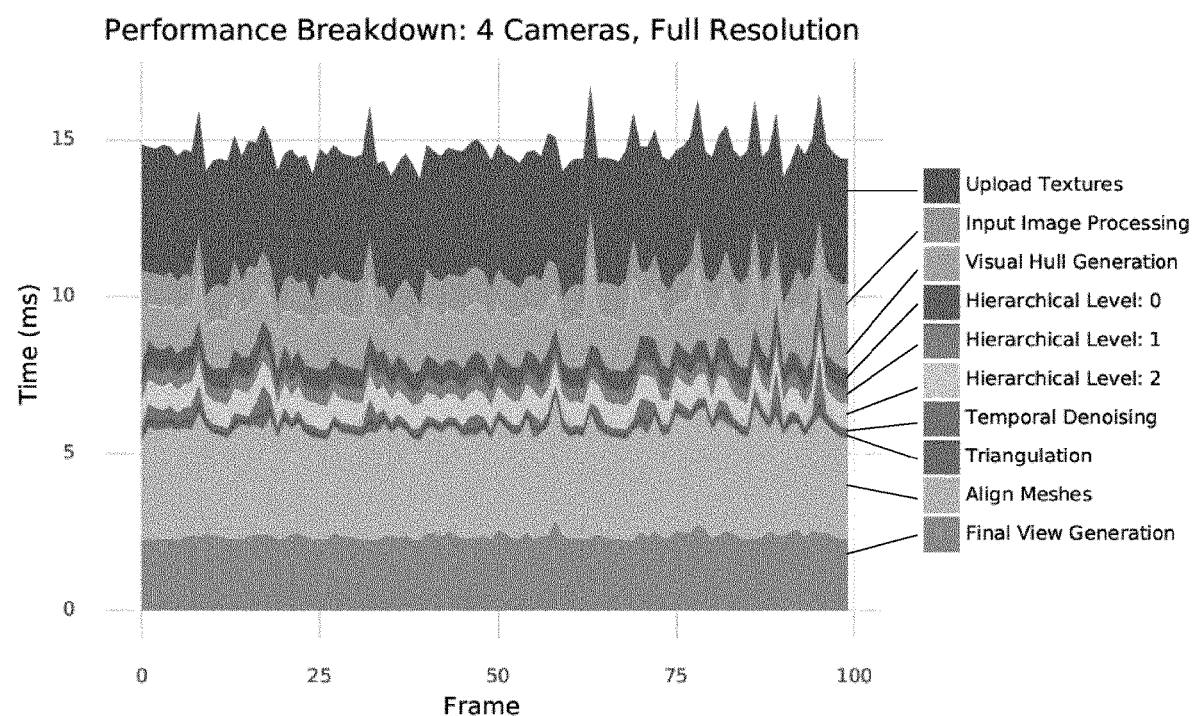
Figure 9C:
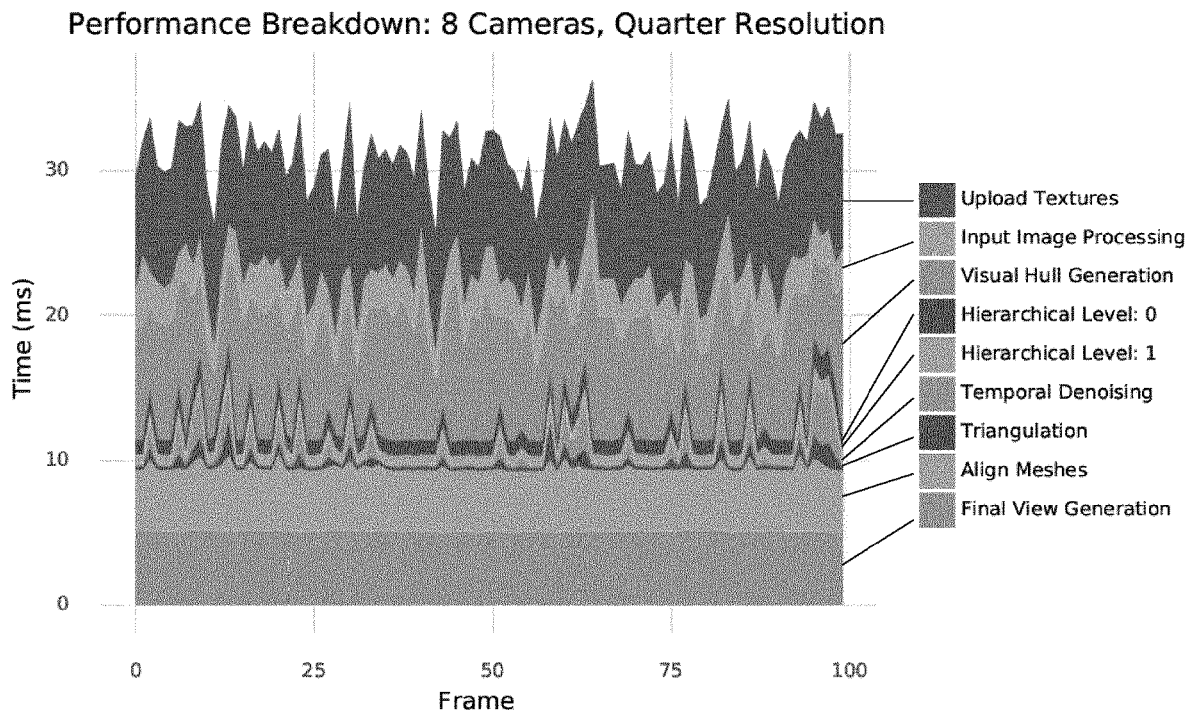
Figure 9D:
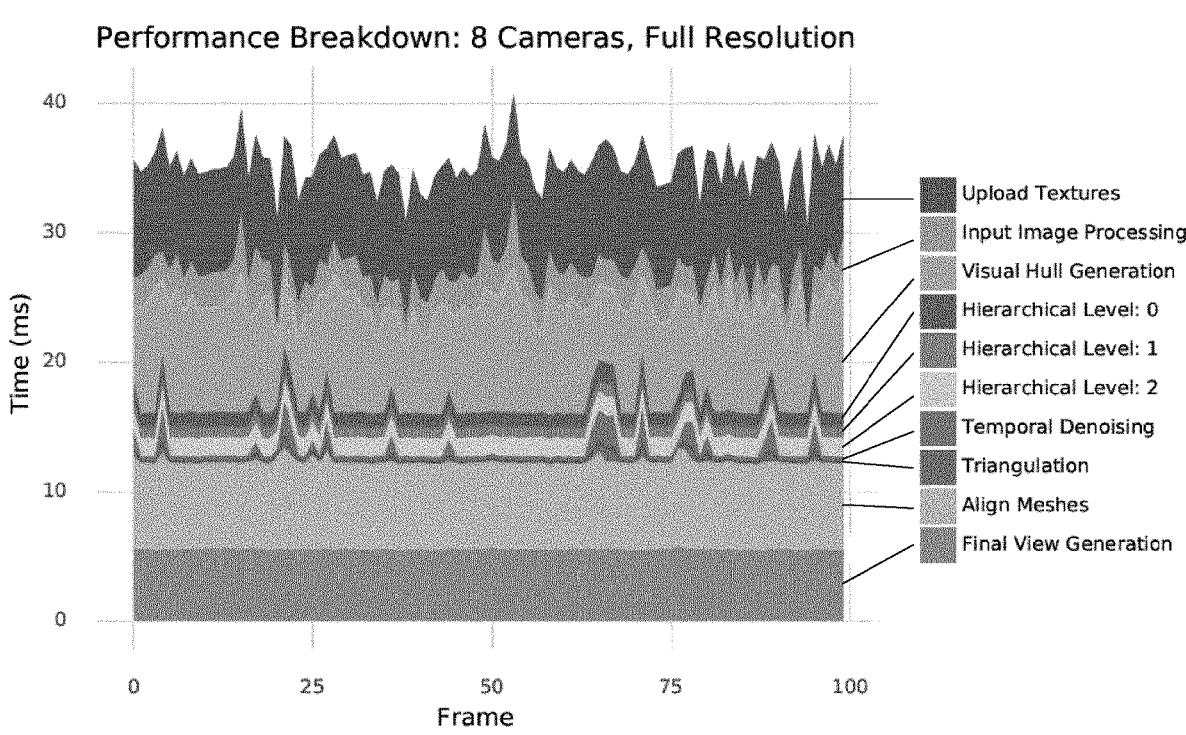

In the FIG. 9d, there is a performance breakdown of the main method steps of the pipeline according to one embodiment, for 100 frames using full resolution and the setup of four camera pairs, in the order that the pipeline steps are employed for each frame. The timings reported are the relevant OpenGL and CUDA times, since they dominate the pipeline.

The image preprocessing step is cheap and contains undistortion, foreground segmentation and conversion to monochrome color, as described above. The visual hull generation step contains the creation of silhouette cones and the projection of this geometry onto each camera to constrain the search space for stereo reconstruction, as described above. The expensive part of this step is the rendering of each camera's silhouette cones from each other camera, since it has quadratic complexity with respect to the number of cameras.

Next there is the stereo reconstruction implemented in CUDA as described above, reported for each hierarchical level. This step is highly optimized and does not take up a significant amount of time in the pipeline. The difference in computation time between hierarchical levels is small and does not increase in proportion to the higher resolution, since we adjust the number of steps taken along the ray when going up the hierarchy. The stereo marching step is dominated by the high number of texture lookups required when matching filters and is thus bottlenecked by the available bandwidth to memory, and how well the caches are utilized. There may be used an implementation where one paralelizes across marching step to ensure that there are enough threads in flight even for low resolutions.

The temporal denoising step, see above, is insignificant in terms of computation. However, if the averaging filter width is W, it requires that the whole pipeline is delayed with a number of frames equal to (W−1)/2.

The last two steps before the final view generation is to triangulate meshes from the geometry buffers and to employ the non-rigid mesh alignment algorithm, as described above. The first of these steps is very cheap, but the other comes at a higher cost, since similarly to the visual hull generation step this step is quadratic in terms of the number of cameras employed.

The lowest area of the graph represents the time it takes to do final view generation as described above. This includes a distance-to-silhouette computation for each projected mesh, computation of mesh visibility and color blending of sampled colors.

In FIGS. 9a-c, the two most important hyper parameters of our pipeline are varied: the number of cameras used and the resolution of the geometry. It can be seen here that for most steps of the pipeline, the number of cameras is the most expensive parameter. All steps increase their processing time when the number of cameras is increased. Most steps increase linearly, but two steps, visual hull generation and align meshes, increase quadratically. The resolution of the geometry affects the pipeline more moderately, mostly by adding one more hierarchical level to the stereo reconstruction. It can also be noted that align meshes becomes more expensive with higher resolution.

In general for FIGS. 9a-d, it can be seen that the performance is stable and only varies slightly from frame to frame. It can also be noted that discounting the top area of the graph representing texture uploads to the GPU, all graphs are well below the 30 Hz frame rate of the used webcams. When four cameras are used, the results are also well below a potential 60 Hz camera source.

Reconstruction Quality

Figure 10:
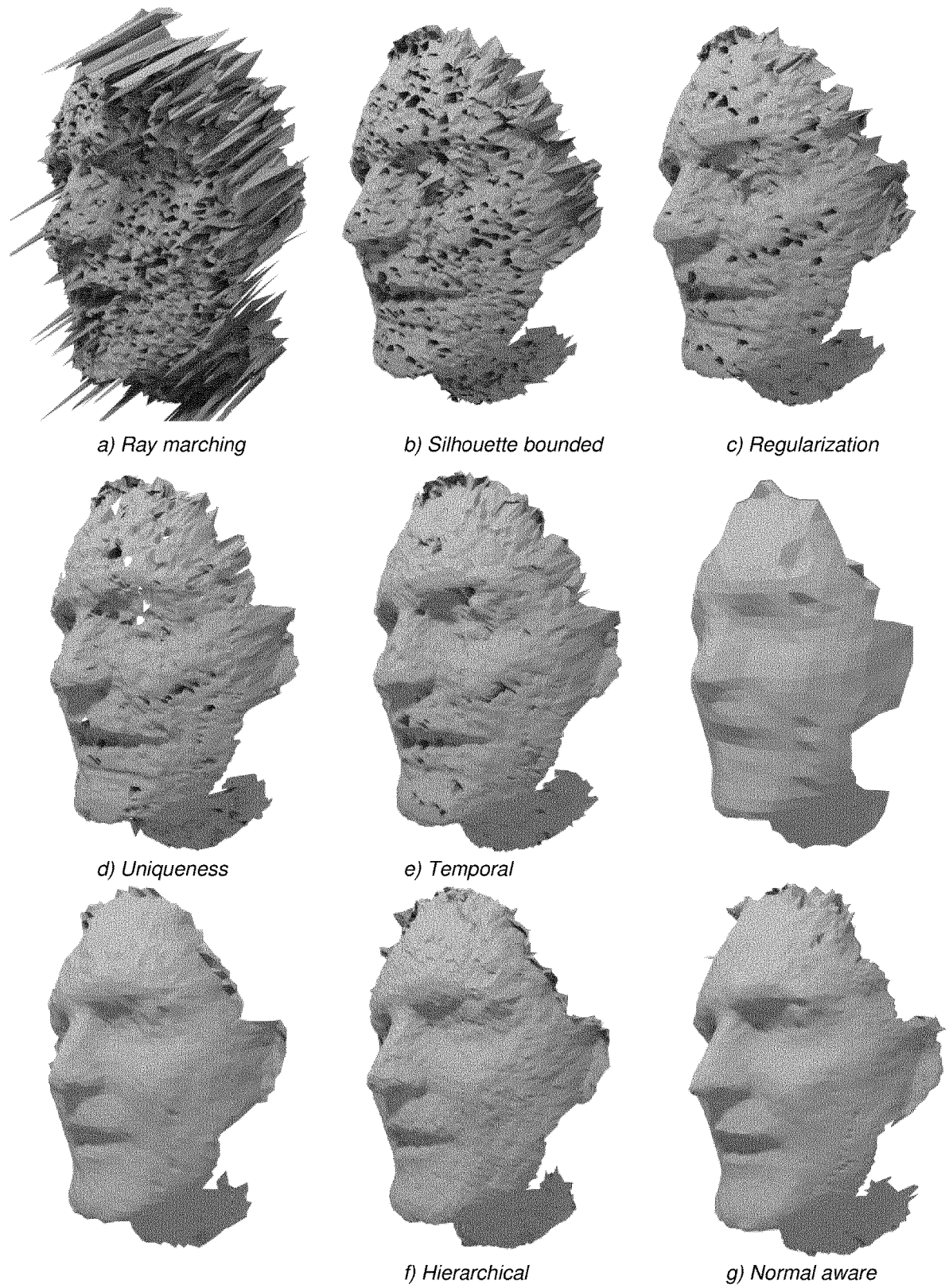
FIG. 10 show images from different steps of a method according to an embodiment of the present invention.

As described above, the disclosed mesh reconstruction method is a combination of a number of techniques. FIG. 10 shows how the results improve with each added technique. A first barebones implementation of our stereo reconstruction can be seen in FIG. 10a, where it is marched along the view ray for each pixel, in full resolution, stripping away everything else from the pipeline. The intersection of each camera's view frustum is used to constrain the search. As can be seen in FIG. 10b, the results can be improved by using the silhouette information available in the input videos to constrain the search region. This also reduces the number of raymarching steps required. Next, in FIG. 10c, it can be seen the results of applying regularization to the noisy results as described above. This smooths the results when neighboring matches are close to the true surface, but outliers will still cause disturbing artifacts. Therefore, the uniqueness test is applied as described above, prior to regularization, to remove outliers (see FIG. 10d). In FIG. 10e, it is shown that averaging the results of the current frame with a few previous and upcoming frames may further improve the results.

At this point, the obtained matches are mostly close to the true surface but, since only very local regularization has been performed, there are still many high-frequency artifacts where remaining erroneous matches can be found. FIG. 10f shows the results of instead reconstructing the mesh hierarchically. Here, a low resolution mesh is constructed first, using all the steps described above. Then, higher resolution meshes are obtained by iteratively repeating the process with a shorter search range around the results obtained from the previous hierarchical step. The hierarchical method also means that an estimation is provided of the surface's normal which improves the results of raymarching and regularization in each step. The final resulting mesh from one camera pair is shown in FIG. 10g.

One mesh is reconstructed per camera pair and all meshes are rendered as seen from the novel viewpoint to obtain the final image. Although the meshes obtained with the method are usually a locally smooth and plausible estimation of the true surface individually, imperfections are easily spotted when the meshes are combined. It may thereby be attempted to align the meshes (as discussed above in terms of mesh alignment). Vertices near edges can be pushed closer to the nearby surface of another mesh to obtain a more coherent result. Finally, the final view is computed using a color weighting scheme (color blending).

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method of real-time generation of a 3D geometry of an object, the method comprising the steps of:
    calibrating at least one RGB camera pair arranged to provide images of the object;
    receiving at least one pair of input images of the object from the at least one RGB camera pair;
    performing an undistortion process of the at least one pair of input images;
    creating a visual hull based on the undistorted at least one pair of input images; and
    performing a stereo reconstruction using the visual hull comprising the steps of:
        a) performing a ray marching operation in a first hierarchical level with a first resolution on the at least one pair of input images to determine geometry positions along each view ray of the images, wherein the first resolution is based on a target geometric resolution for a highest hierarchical level;
        b) applying a uniqueness criterion to the geometry positions and discarding geometry positions not fulfilling the uniqueness criterion;
        c) determining a normal for each geometry position;
        d) performing a regularization operation based on the geometry positions and the respective normal by intersecting each view ray with planes constructed from neighboring geometry positions and normals, and providing updated geometry positions as edge-preserving weighted averages of intersections with a respective updated normal;
        e) performing an interpolation operation on the updated geometry positions and optionally the respective updated normal to increase a resolution in each respective dimension, by first a horizontal interpolation of the geometry positions followed by a vertical interpolation of the geometry positions;
    wherein the method further comprises repeating steps a) and c)-e) in at least one iteration in at least one ascending hierarchical level of the ray marching operation, wherein the resolution in the ascending hierarchical level of the ray marching operation is increased in each dimension by the interpolation operation for each iteration until the target geometric resolution for the highest hierarchical level is reached, resulting in a geometry buffer for each of the at least one RGB camera pair, and
    wherein the method further comprises, after a final iteration, a step of performing a mesh alignment comprising the steps of:
        f) performing a triangulation of position buffers and normals into meshes;
        g) performing a non-rigid alignment to merge the meshes;
        h) creating a distance map comprising screen-space coordinates of an object silhouette closest to that particular screen-space location for each projected pixel in the merged mesh;
        i) rendering, for each mesh of a selected RGB camera of an RGB camera pair, all other meshes from the selected RGB camera's view to get a depth map;
        j) performing, for each position in the mesh of the selected RGB camera, a screen-space ray marching operation in a normal direction in the depth map, to determine if there are any intersections with another mesh, and if an intersection is determined a vector in a direction of the intersection, or average of intersections if there are several, is stored in an output texture; and
        k) averaging vectors for each mesh with their neighboring vectors and wherein the averaged vectors are applied to each corresponding position in the mesh.

2. The method according to claim 1, wherein the step of creating the visual hull comprises a step of determining intersections of silhouette cones from the selected RGB camera towards the object by rendering every other RGB camera's silhouette cone, using depth values of these rendered silhouette cones to create a depth map after repeating the step of determining intersections of silhouette cones for every RGB camera in the at least one RGB camera pair, wherein the depth map is used as a starting position for the stereo reconstruction.

3. The method according to claim 1, wherein the step of performing the interpolation operation comprises a step of performing a horizontally aligned interpolation of the geometry positions and normals followed by a vertically aligned interpolation of the geometry positions and normals.

4. The method according to claim 1, wherein the resolution in each respective dimension is doubled for each iterated ascending hierarchical level, and the step of interpolation comprises a doubling of the resolution in each respective dimension.

5. The method according to claim 1, wherein a length of the vectors stored in the output texture is weighted with a distance to the closest silhouette point determined from the distance map.

6. The method according to claim 1, wherein the method further comprises a step of
    l) updating the normals based on a geometry of the mesh alignment.

7. The method according to claim 6, wherein the method further comprises a step of
    m) repeating steps f)-l) in at least one iteration for all meshes until a desired level of alignment is reached.

8. The method according to claim 1, further comprising a step of determining a surface to which positions in the geometry buffer belong when meshes are overlapping comprising rendering a closest front-facing surface and a closest back-facing surface, sorting view-samples according to depth, determining whether a back-facing sample is between two front-facing samples, and if so, discarding subsequent samples.

9. The method according to claim 1, wherein the method further comprises a step of:
performing a color blending operation in which colors are sampled from said at least one RGB camera pair and weighted together.

10. The method according to claim 9, wherein the weighting of the sampled colors uses a linear combination of two weights for each sample.

11. The method according to claim 10, wherein the color C of each color sample is determined by calculating $$C = \frac{\sum_n \phi \omega_{d,n} c_n + (1-\phi)\omega_{v,n} c_n}{\sum_n \phi \omega_{d,n} + (1-\phi)\omega_{v,n}}$$

wherein $\phi$ is a parameter between 0 and 1, $c_n$ is each color sample, and $\omega_{d,n}$ and $\omega_{v,n}$ are the weights for each sample n, wherein the first weight $\omega_{d,n}$ is sampled directly from the distance map and the second weight $\omega_{v,n}$ is provided by $$\omega_{v,n} = (v_{0,n} - v_{c,n}) \cdot \frac{v_{0,n}}{|v_{0,n}|}$$

wherein $v_{0,n}$ is the view space position of the sample n, and $v_{c,n}$ is the corresponding camera position.

12. The method according to claim 1, wherein the step of calibrating the at least one RGB camera pair comprises a step of performing a structure from motion, SfM, process using the object.

13. A 3D image generation device comprising a receiving unit and a processing unit, wherein the device is configured to perform a method, comprising:
calibrating at least one RGB camera pair arranged to provide images of the object;
receiving at least one pair of input images of the object from the at least one RGB camera pair;
performing an undistortion process of the at least one pair of input images;
creating a visual hull based on the undistorted at least one pair of input images; and
performing a stereo reconstruction using the visual hull comprising the steps of:
a) performing a ray marching operation in a first hierarchical level with a first resolution on the at least one pair of input images to determine geometry positions along each view ray of the images, wherein the first resolution is based on a target geometric resolution for a highest hierarchical level;
b) applying a uniqueness criterion to the geometry positions and discarding geometry positions not fulfilling the uniqueness criterion;
c) determining a normal for each geometry position;
d) performing a regularization operation based on the geometry positions and the respective normal by intersecting each view ray with planes constructed from neighboring geometry positions and normals, and providing updated geometry positions as edge-preserving weighted averages of intersections with a respective updated normal;
e) performing an interpolation operation on the updated geometry positions and optionally the respective updated normal to increase a resolution in each respective dimension, by first a horizontal interpolation of the geometry positions followed by a vertical interpolation of the geometry positions;
wherein the method further comprises repeating steps a) and c)-e) in at least one iteration in at least one ascending hierarchical level of the ray marching operation, wherein the resolution in the ascending hierarchical level of the ray marching operation is increased in each dimension by the interpolation operation for each iteration until the target geometric resolution for the highest hierarchical level is reached, resulting in a geometry buffer for each of the at least one RGB camera pair, and
wherein the method further comprises, after a final iteration, a step of performing a mesh alignment comprising the steps of:
f) performing a triangulation of position buffers and normals into meshes;
g) performing a non-rigid alignment to merge the meshes;
h) creating a distance map comprising screen-space coordinates of an object silhouette closest to that particular screen-space location for each projected pixel in the merged mesh;
i) rendering, for each mesh of a selected RGB camera of an RGB camera pair, all other meshes from the selected RGB camera's view to get a depth map;
j) performing, for each position in the mesh of the selected RGB camera, a screen-space ray marching operation in a normal direction in the depth map, to determine if there are any intersections with another mesh, and if an intersection is determined a vector in a direction of the intersection, or average of intersections if there are several, is stored in an output texture; and
k) averaging vectors for each mesh with their neighboring vectors and wherein the averaged vectors are applied to each corresponding position in the mesh.

14. A system for generating a 3D image reconstruction comprising at least one RGB camera pair and a 3D image generation device, the 3D image generation device comprising a receiving unit and a processing unit, wherein the device is configured to perform a method, comprising:
calibrating at least one RGB camera pair arranged to provide images of the object;
receiving at least one pair of input images of the object from the at least one RGB camera pair;
performing an undistortion process of the at least one pair of input images;
creating a visual hull based on the undistorted at least one pair of input images; and
performing a stereo reconstruction using the visual hull comprising the steps of:
a) performing a ray marching operation in a first hierarchical level with a first resolution on the at least one pair of input images to determine geometry positions along each view ray of the images, wherein the first resolution is based on a target geometric resolution for a highest hierarchical level;
b) applying a uniqueness criterion to the geometry positions and discarding geometry positions not fulfilling the uniqueness criterion;
c) determining a normal for each geometry position;

d) performing a regularization operation based on the geometry positions and the respective normal by intersecting each view ray with planes constructed from neighboring geometry positions and normals, and providing updated geometry positions as edge-preserving weighted averages of intersections with a respective updated normal;

e) performing an interpolation operation on the updated geometry positions and optionally the respective updated normal to increase a resolution in each respective dimension, by first a horizontal interpolation of the geometry positions followed by a vertical interpolation of the geometry positions;

wherein the method further comprises repeating steps a) and c)-e) in at least one iteration in at least one ascending hierarchical level of the ray marching operation, wherein the resolution in the ascending hierarchical level of the ray marching operation is increased in each dimension by the interpolation operation for each iteration until the target geometric resolution for the highest hierarchical level is reached, resulting in a geometry buffer for each of the at least one RGB camera pair, and wherein the method further comprises, after a final iteration, a step of performing a mesh alignment comprising the steps of:

f) performing a triangulation of position buffers and normals into meshes;

g) performing a non-rigid alignment to merge the meshes;

h) creating a distance map comprising screen-space coordinates of an object silhouette closest to that particular screen-space location for each projected pixel in the merged mesh;

i) rendering, for each mesh of a selected RGB camera of an RGB camera pair, all other meshes from the selected RGB camera's view to get a depth map;

j) performing, for each position in the mesh of the selected RGB camera, a screen-space ray marching operation in a normal direction in the depth map, to determine if there are any intersections with another mesh, and if an intersection is determined a vector in a direction of the intersection, or average of intersections if there are several, is stored in an output texture; and k) averaging vectors for each mesh with their neighboring vectors and wherein the averaged vectors are applied to each corresponding position in the mesh.

* * * * *